Nov. 15, 1966  D. W. SAMES  3,286,092
RADIOGRAPHIC FILM CASSETTE AND FILM HOLDER WITH MEANS FOR
AUTOMATIC UNLOADING OF THE FILM INTO
A PROCESSING APPARATUS
Filed Jan. 24, 1964  3 Sheets-Sheet 1
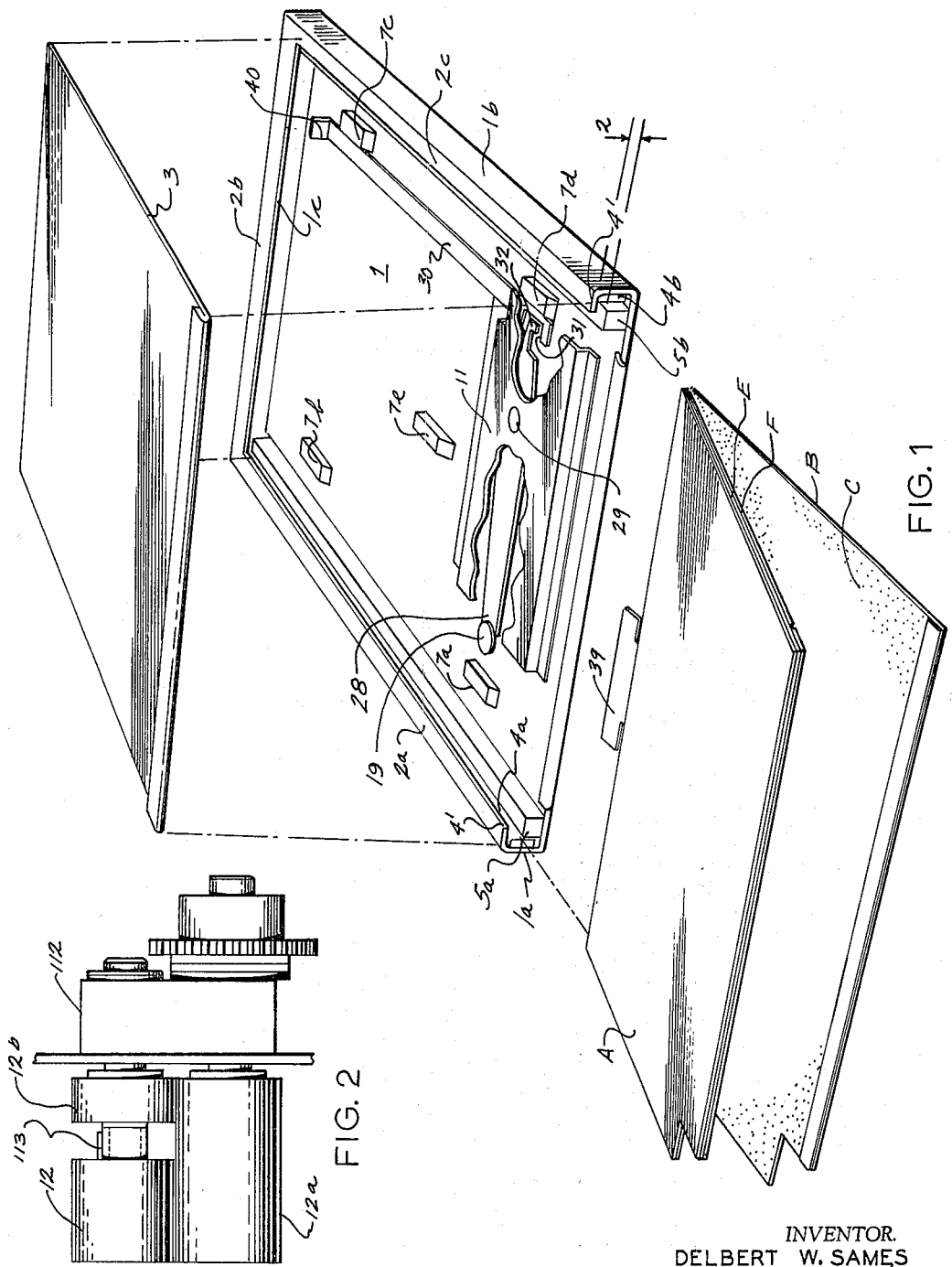
INVENTOR.
DELBERT W. SAMES

INVENTOR.
DELBERT W. SAMES

Nov. 15, 1966 D. W. SAMES 3,286,092
RADIOGRAPHIC FILM CASSETTE AND FILM HOLDER WITH MEANS FOR
AUTOMATIC UNLOADING OF THE FILM INTO
A PROCESSING APPARATUS
Filed Jan. 24, 1964 3 Sheets-Sheet 3

INVENTOR.
DELBERT W. SAMES
BY

United States Patent Office 3,286,092
Patented Nov. 15, 1966

3,286,092
RADIOGRAPHIC FILM CASSETTE AND FILM HOLDER WITH MEANS FOR AUTOMATIC UNLOADING OF THE FILM INTO A PROCESSING APPARATUS
Delbert W. Sames, Conklin, N.Y., assignor to General Aniline & Film Corporation, New York, N.Y., a corporation of Delaware
Filed Jan. 24, 1964, Ser. No. 340,059
4 Claims. (Cl. 250—68)

This invention relates to photographic film cassettes and, particularly, to cassettes which are used in connection with radiography.

In the making of radiographs, commonly termed X-ray pictures, it is very important that the cassette containing the sensitized film and the intensifying screen be sturdy, easily loadable, and assuredly light-tight under severe handling and repeated usage.

It is a primary object of the invention to provide a cassette which may be easily loaded in the darkroom, is of sturdy construction, and adapted for automatic unloading of the film upon insertion of the cassette into a daylight-type processing apparatus.

It is an ancillary object of the invention to provide a film cassette for radiographic film which accommodates an intensifying screen and a film sheet between pressure plates forming a sandwich and includes means for extruding a portion of this sandwich to a sufficient extent for exposing a corner of the film sheet. The latter may be gripped by hand, in the case of darkroom processing, but, preferably, by mechanical means, to extract the film in a daylight-type processing apparatus.

A particular feature of the invention is that the film cassette, in combination with a processing apparatus of special construction, will automatically release the film for power-operated conveyance into the apparatus.

Other objects and features will be apparent from the following description of the invention, pointed out in particularity in the appended claims, and taken in connection with the accompanying drawings in which:

FIG. 1 is an exploded view, in perspective, showing the cassette partly disassembled, certain parts being broken away to show mechanical operating elements more clearly;

FIG. 2 is a fragmentary detail view of pertinent elements of a processing machine which cooperate in the removal of the film from the cassette of FIG. 1;

Referring first to FIG. 1, the cassette comprises a rectangular main frame 1 having a substantially flat base with upturned side flanges 1a and 1b and rear end flange 1c. These flanges are all turned in at the top as indicated at 2a, 2b, 2c. This base is made of suitable corrosion resistant material, such as stainless steel.

Figure 9:
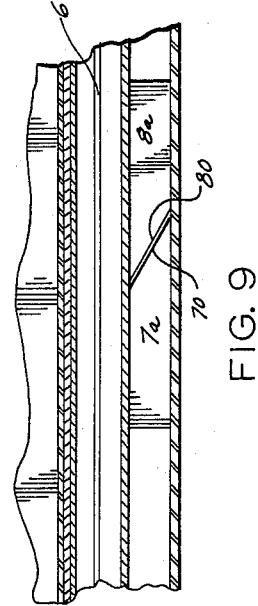
FIG. 9 is an enlarged fragmentary sectional view similar to FIG. 7 but showing certain parts in the position of FIG. 8.
Figure 6:
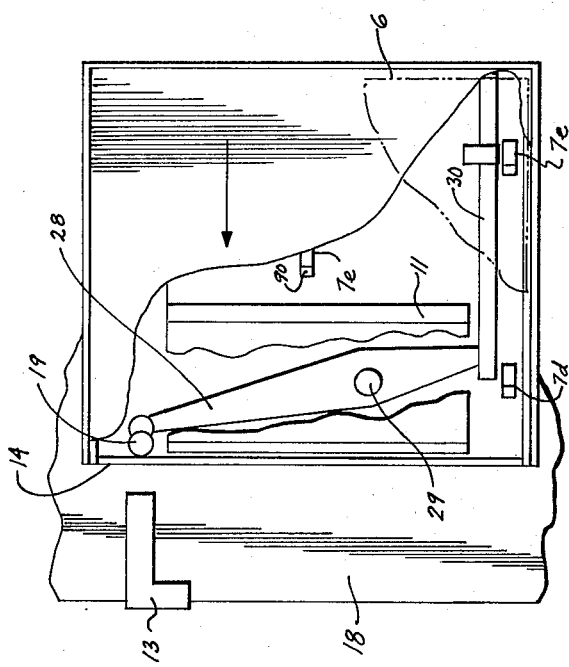
FIG. 6 is a plan view of the cassette with certain parts broken away to show the internal construction, showing also a fragmentary part of the processing equipment.
Figure 7:
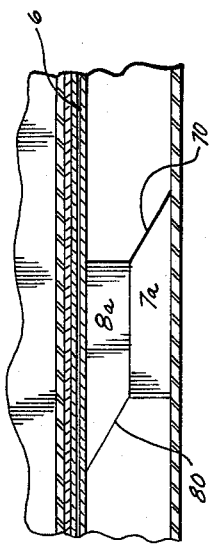
FIG. 7 is an enlarged fragmentary sectional view, taken substantially along the line A—A of FIG. 8.

Within the side flanges there are mounted strips 4a, 4b of similar material, and these are spot welded to the frame 1. They are spaced below the inturned flanges 2a, 2c so as to provide a groove on either side for the installation of a top plate 3. The latter is made of X-ray radiation transparent material. Plate 3, when inserted, is held permanently in position by crimping the corners 4' of the inturned flanges 2a, 2c. Spacing bars 5a and 5b, and spacers 7a, 7b, 7c, 7d and 7e are attached to the base plate 1 by spot welding. Companion spacers 8a, 8b, 8c, 8d, and 8e, are attached to the bottom plate B of the film sandwich. These are shown in FIGS. 1, 6, and 7. The spacers 7a, 7b, 7c, and 7d are beveled on their front ends, as indicated at 70 in FIGS. 7 and 9. Corresponding bevels 80 are provided on the spacers 8a, 8b, 8c, and 8d. The central spacer 7e, located near the middle of the bottom plate, has a bevel 90 on its front end. The function of the spacers is to assure that the film and fluorescent screen F are in intimate contact when the sandwich is closed as it is inserted into the cassette. The spacers also provide enough pressure to hold it tightly closed by reason of the fact that the beveled surfaces 70 and 80 cause the advancing sandwich to be placed under pressure as the one spacer, 8a for example, rides up on the corresponding spacer 7a (see FIG. 7). Insertion of the sandwich into the cassette therefore clamps it tightly closed and protects the film against possible exposure to stray light rays. Before insertion, the parts are in the position shown in FIG. 9 and clamping pressure is applied to the film sandwich only during its final three-quarter of an inch or so of travel to its fully inserted position.

A flat pivoted lever 28 is mounted on the base plate, being secured thereto by pivot pin 29. This lever is designed to be actuated about its pivot when the cassette is inserted into the processing machine. On insertion, for example, the lever 28 pivots in clockwise direction about point 29 and this causes movement of a drag link 30 which is slidably positioned on the base plate 1. As best seen in FIG. 1, drag link 30 is notched at 31 to receive the reduced end 32 of lever 28. The arrangement is such that the drag link must move longitudinally when the lever 28 moves about its pivot 29. As previously mentioned, the drag link 30 slides along beside the elements 7d and 7c. It has an upturned end 40 which engages behind the film-bearing sandwich when the latter is inserted into the cassette.

Figure 3:
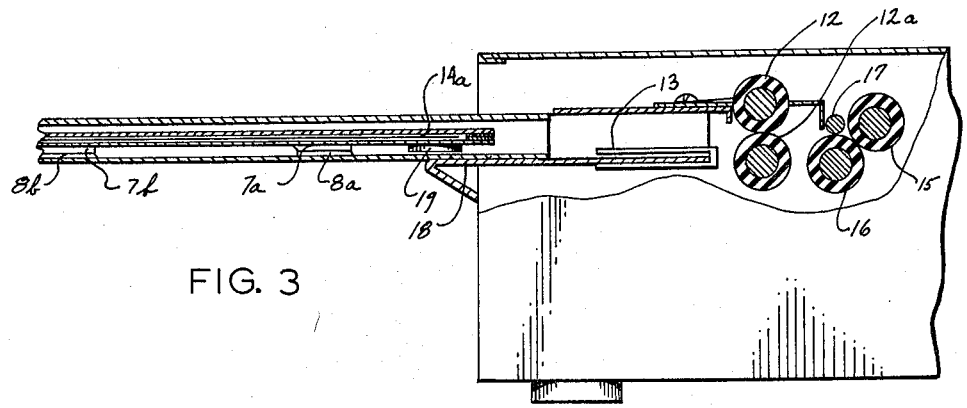
FIG. 3 is a fragmentary elevational view, with certain parts in section, of the cassette of FIG. 1, shown about to be inserted into the processing apparatus.
Figure 4:
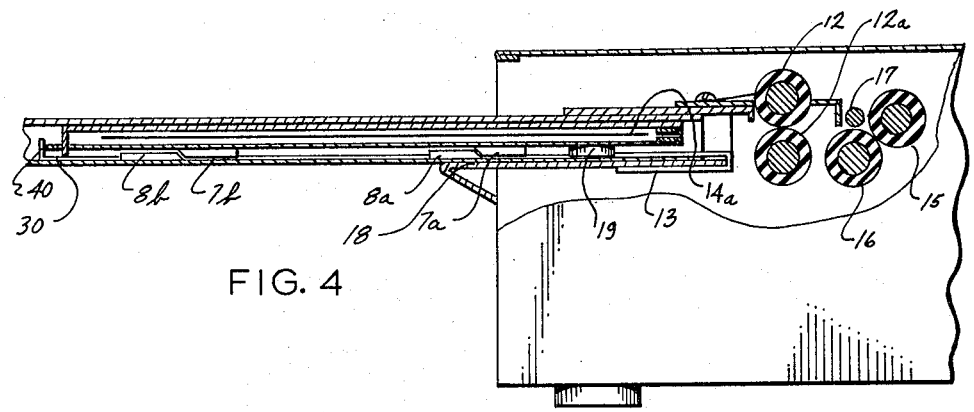
FIG. 4 is a view similar to FIG. 3, showing a further phase of insertion of the cassette.
Figure 5:
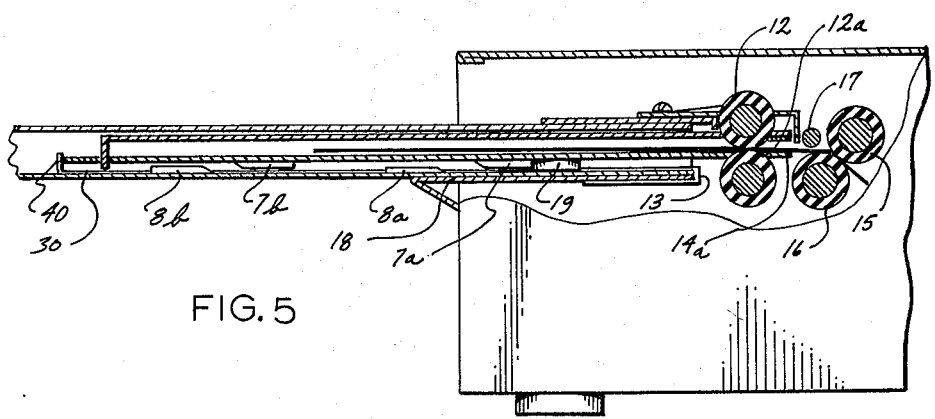
FIG. 5 is a further view, showing full insertion of the cassette and partial opening of the extruded sandwich so as to unload the film.
Figure 8:
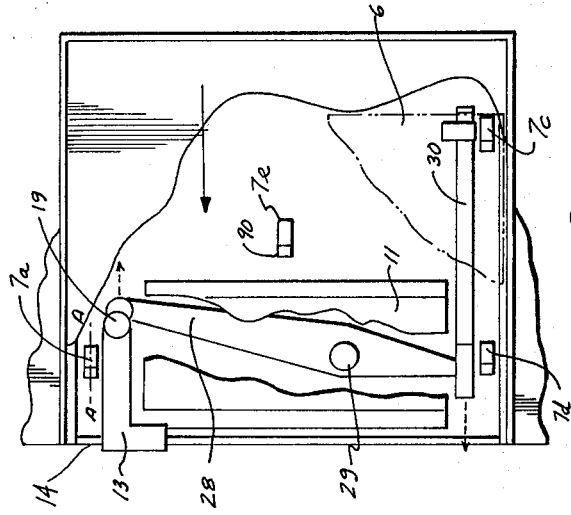
FIG. 8 is a plan view similar to FIG. 7 but showing certain parts in a different position.

Inside the processing machine there is mounted a stationary member 13, see also FIGS. 3 to 5, which is adapted to engage a lug or boss 19 on the far end of the lever 28 as the cassette is inserted into the machine. Referring to FIG. 6, it will be noted that the lever lug 19 is approaching the stop 13 as the cassette is being inserted into a machine, part of which is indicated generally at 18. By comparison with FIG. 8, it will be noted that further advance of the cassette causes the lever 28 to rock about its pivot 29 in a clockwise direction. This moves the drag link 30 forward, or to the left, as seen in FIG. 8. This motion pushes the film sandwich partially out of the cassette and drops the spacers 7a, 8a etc., to the unlocked or unclamped position shown in FIG. 9. With this movement the sandwich is unclamped and the film is free to be moved out of it as well as out of the cassette.

As the matching spacers 7a, 8a, etc., are brought out of their superimposed position, the bottom plate B of the film sandwith drops enough to free the film for removal from the sandwich and from the cassette by the processing machine. Meanwhile, the top plate A of the sandwich is kept in position by the guide strips 5a and 5b.

As seen in FIG. 1, a guide plate 11 is attached to the base 1 which also covers the lever 7 and its pivot, so as to protect them from interference with the sliding of the film sandwich.

The film-bearing sandwich is constructed as follows: its top plate is made of light metal which is substantially transparent to X-rays, for example, aluminum. This plate A is interlocked with the bottom plate B by means of a tab 39 on one element, which projects through a suitable slot in the other. This arrangement permits relative sliding movement between the top and bottom plates of the sandwich.

Plate A is equipped with a flange near the joint 39 which provides a stop for the film when loading. This flange also acts as a pusher for the film during the unloading operation. The tongue element 39 permits enough relative motion between the top plate A and the bottom plate B to permit the extension 40 to push the sandwich out far enough to allow the film to be grasped by the extracting means in the processing apparatus. The bottom of plate B is preferably made of stainless steel and the interlocking of tongue 39 assures general movement of both plates as a unit. The two plates A and B are offset along their light-sealing edge to provide easier darkroom loading. Attached to the top surface of the bottom plate B is a velveteen layer C for padding.

Attached to the lower side of the top plate A is a piece of chipboard E which serves to lower the film plane to a position where it cannot become lodged between the strips 5a, 5b and the top sheet A in the loading or unloading operation. On the bottom of the chipboard E there is fastened a fluorescent screen F for the purpose of intensifying the X-ray image on the emulsion of film. This intensification is especially effective when intimate contact between the film emulsion and the screen F is obtained. In order to obtain such contact, the bottom plate B is slightly curved which acts at the central portion of the film to apply pressure thereto when the sandwich plates are closed towards each other.

In use, the cassette is loaded in a darkroom and is closed by fully inserting the sandwich into the main frame unit. After exposure the cassette (see FIG. 3), with its sheet of X-ray film enclosed, is inserted into a light-tight opening in the front of the processing machine. The front end of the cassette is indicated at 14 and the actuating lug 19 of lever 28 is shown approaching the stop element 13. The processing apparatus includes film-extracting rollers 12 and 12a, suitably held in frictional contact and positively driven, to remove the film from the cassette as soon as they can grasp it. These forward the film under a guide roller 17 to a pair of feed-in rollers 15 and 16, which convey the film to the processing baths.

The latter processing apparatus forms no part of the present invention. It is described in a copending application of S. J. Klem, Jr., and H. F. Nitka for "Apparatus for Processing Photographic Materials."

Referring next to FIG. 4, it will be noted that as the lug 19 contacts the stop 13 it starts to actuate the lever 28. The continued movement of the lever moves the sandwich with respect to the base unit or frame and removes the mating pressure between the spacers. This allows the sandwich to spring open. Because of the operation of the drag link 30 and its upturned extension 40, the film sandwich starts moving forward and is seen in FIG. 5.

Since the film is now unclamped, the front end 14a thereof is projected into the bite of the withdrawal rollers 12 and 12a. These are in motion and pull the film out of the cassette and convey it forward to the feed-in rollers 15 and 16.

The roller 17 is preferably a driven roller which serves to keep the leading edge of the film straight and insure its proper insertion into the feed-in rollers 15 and 16.

While the extraction rollers, etc., form no part of the present invention, it will be noted that the roller 12 (FIG. 2) is mounted in a pivoting type bearing mount 112, and is spring-loaded at 113 to hold it in contact with the solidly mounted lower roller 12a. This arrangement provides for positive driving of the upper roller, since the roller extension element 12b is kept in contact with the lower roller 12a at all times, even when the main roller 12 is brought out of contact with the lower roller by the interposition of a film.

What is claimed is:
1. A cassette for radiographic sheet material comprising, in combination, a main frame having a base plate, channeled sides and one open side, an X-ray transparent cover on said frame, a film holder comprising a pair of sheet members joined at one end and normally biased to spring apart, guide channels in said main frame adapted to receive the holder and to bring its sheet members loosely together, and mating locking pads at opposite ends of said holder and said frame respectively, said pads being adapted when in locking position to clamp the film in said holder, and control means for moving said pads out of alignment.

2. Combination according to claim 1 wherein the control means comprises a lever adapted to be moved on contact with a fixed abutment.

3. A radiographic film cassette adapted to be unloaded automatically on insertion into a device having a fixed abutment, said cassette comprising, in combination, a base plate, channeled sides and one open side, and an X-ray transparent cover, guide means associated with said base plate for receiving a film sandwich device, means for clamping said device in said cassette comprising mating locking pads on opposite ends of said base plate and said device respectively, said locking pads being adapted when aligned to press said device against said cover and to release such pressure when said device is moved towards said open side to bring said pads out of alignment, and actuating means secured to said base plate and adapted on contact with said abutment to advance said device towards said open side and to move said pads out of alignment.

4. A cassette according to claim 3 wherein said actuating means comprises a longitudinally sliding bar carried by said base plate and a lever pivoted to said base plate.

References Cited by the Examiner
UNITED STATES PATENTS

| | | | |
|---|---|---|---|
| 2,056,279 | 9/1936 | Kulick | 250—68 |
| 2,196,063 | 4/1940 | Engel | 250—66 |
| 2,810,837 | 10/1957 | Kizaur | 250—68 |
| 2,823,318 | 2/1958 | Gacki | 250—68 |
| 3,153,145 | 10/1964 | Yerkovich | 250—68 |
| 3,174,039 | 3/1965 | Frede et al. | 250—68 |

RALPH G. NILSON, *Primary Examiner.*

W. F. LINDQUIST, *Assistant Examiner.*